United States Patent Office 3,185,680
Patented May 25, 1965

3,185,680
REDUCED BENZODIAZEPINIUM COMPOUNDS
Peter Hsing-Lien Wei, Upper Darby, Pa., assignor to American Home Products Corporation, New York, N.Y., a corporation of Delaware
No Drawing. Filed Oct. 16, 1962, Ser. No. 231,043
3 Claims. (Cl. 260—239.3)

This invention relates to novel compounds having psychotherapeutic and hypotensive properties and to processes for making such compounds.

More specifically, the present invention is concerned with hydropyrido (1,2-d)(1,4) benzodiazepin-6-(5H)-ones, the letter "d" being used as shown in the formula below to locate the point of attachment of the pyridine ring to the diazepine ring.

The compounds of this invention may be represented by the formula:

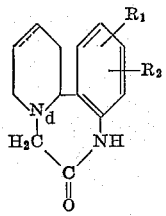

I wherein $R_1$ is hydrogen, halogen, haloalkyl or lower alkyl and $R_2$ is chlorine or hydrogen; and the dotted line between the 10 and 11 carbon atoms indicates that the compounds may be saturated or unsaturated at this position, the saturated compounds being identified by the octahydro designation and the 10–11 unsaturated compounds being identified by the hexahydro designation.

The compounds of this invention are produced by reducing a 5,7-dihydro-6-oxo-6H-pyrido(1,2-d)(1,4) benzodiazepinium halide with hydrogen in the presence of a noble metal or noble metal oxide hydrogenation catalyst such as palladium on carbon or platinum oxide to give the corresponding 5,7,8,9,10,11,12,12a-octahydro-6H-pyrido(1,2-d)(1,4)benzodiazepin-6-one, (III), or by heating in aqueous solution with a 3 to 5-fold excess of sodiumborohydride to form the corresponding 5,7,8,9,-12,12a-hexahydro-6H-pyrido(1,2-d)(1,4)benzodiazepin-6-one (IV). The reactions involved in the preparation of the subject compounds are shown below.

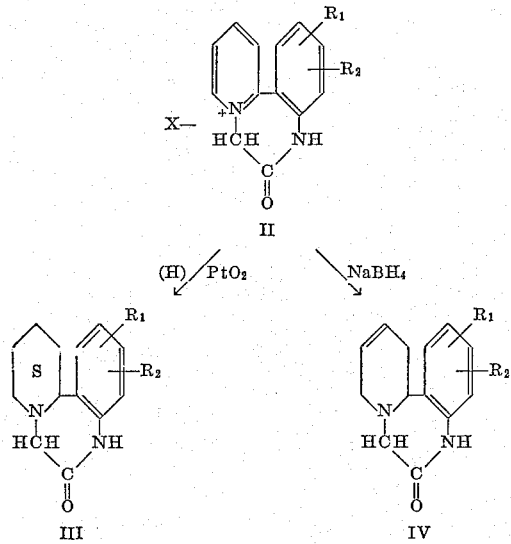

where $R_1$ and $R_2$ are as above stated and X is chlorine or bromine.

Compounds of Formula II together with methods for their preparation are disclosed and claimed in my copending application Serial No. 230,995, filed even day herewith.

The following examples illustrate the best mode of carrying out the invention.

EXAMPLE I 5,7,8,9,10,11,12,12a-octahydro-6H-pyrido(1,2-d)(1,4) benzodiazepin-6-one 3.3 g. of 5,7-dihydro-6-oxo-6H-pyrido-(1,2-d)(1,4) benzodiazepinium chloride are dissolved in water (150 cc.) and the solution reduced in a Paar hydrogenator at room temperature (initial pressure 34 lbs.) in the presence of platinum oxide catalyst. The theoretical amount (3 moles) of hydrogen is picked up in 25 minutes. The used catalyst is filtered off. The filtrate which contains the hydrochloride salt of the reduction product is neutralized with sodium bicarbonate solution. The free amine is a white crystalline material which was recrystallized from methanol, M.P. 203–5° C.

Calc. for $C_{13}H_{16}N_2O$: C, 72.2; H, 7.45; N, 12.95. Fd.: C, 71.92; H, 7.29; N, 13.11.

EXAMPLE II 5,7,8,9,12,12a-hexahydro-6H-pyrido(1,2-d)(1,4) benzodiazepin-6-one 3.2 g. of 5,7-dihydro-6-oxo-6H-pyrido-(1,2-d)(1,4) benzodiazepinium chloride are first dissolved in water (80 cc.). A calculated excess of an aqueous solution of sodium borohydride is slowly added. A certain amount of heat is generated. The mixture is heated on a steam bath for a half-hour and then cooled. The light yellow solids are collected and then dried. The crude material is recrystallized from methanol and melted at 205–8° C.

Calc. for $C_{13}H_{14}N_2O$: C, 73.0; H, 6.60; N, 13.1. Fd.: C, 72.68; H, 6.57; N, 13.05.

EXAMPLE III

Following the procedure of Example I, 2,3-dichloro-5,7-dihydro-6-oxo-6H-pyrido(1,2-d)(1,4)benzodiazepinium chloride is reduced to 2,3-dichloro-5,7,8,9, 10,11,12,12a-octahydro-6H-pyrido(1,2-d)(1,4)benzodiazepin-6-one.

EXAMPLE IV

Following the procedure of Example II, 2,3-dichloro-5,7-dihydro-6-oxo-6H-pyrido(1,2-d)(1,4)benzodiazepinium chloride is reduced to 2,3-dichloro-5,7,8,9, 12,12a-hexahydro-6H-pyrido(1,2-d)(1,4)benzodiazepin-6-one.

EXAMPLE V

Following the procedure of Example I, 2-chloro-5,7-dihydro-6-oxo-6H-pyrido(1,2-d)(1,4)benzodiazepinium chloride is reduced to 2-chloro-5,7,8,9, 10,11,12-12a-octahydro-6H-pyrido(1,2-d)(1,4)benzodiazepin-6-one.

EXAMPLE VI

Following the procedure of Example II, 2-chloro-5,7-dihydro-6-oxo-6H-pyrido(1,2-d)(1,4)benzodiazepinium chloride is reduced to 2-chloro-5,7,8,9, 12,12a-hexahydro-6H-pyrido-(1,2-d)(1.4)benzodiazepin-6-one.

EXAMPLE VII

Following the procedure of Example I, 2-bromo-5,7-dihydro-6-oxo-6H-pyrido(1,2-d)(1,4)benzodiazepinium chloride is reduced to 2-bromo-5,7,8,9, 10,11,12,12a-octahydro-6H-pyrido(1,2-d)(1,4)benzodiazepin-6-one.

EXAMPLE VIII

Following the procedure of Example II, 2-bromo-5,7-dihydro-6-oxo-6H-pyrido(1,2-d)(1,4)benzodiazepinium chloride is reduced to 2-bromo-5,7,8,9,12,12a-hexahydro-6H-pyrido-(1,2-d)(1,4)benzodiazepin-6-one.

EXAMPLE IX

Following the procedure of Example I, 2-trifluoromethyl-5,7-dihydro-6-oxo-6H-pyrido(1,2-d)(1,4)benzodiazepinium bromide is reduced to 2-trifluoromethyl-5,7,8,9,10,11,12,12a-octahydro-6H-pyrido(1,2-d)(1,4)benzodiazepin-6-one.

EXAMPLE X

Following the procedure of Example II, 2-trifluoromethyl-5,7-dihydro-6-oxo-6H-pyrido(1,2-d)(1,4)benzodiazepinium bromide is reduced to 2-trifluoromethyl-5,7,8,9,12,12a-hexahydro-6H-pyrido(1,2-d)(1,4)benzodiazepin-6-one.

Solutions, tablets, pills and the like containing, for example, 25, 100, 500 mg. or more of one or more of the present compounds can be made available for symptomatic adjustment of the dosage to the individual patient. Such dosages appear to be well below the toxic dose of the novel compounds of this invention as shown by the acute intravenous $LD_{50}$ in mice of one of the compounds falling within the scope of this invention; that is, of 5,7,9,10,11,12,12a-octahydropyrido(1,2-d)(1,4)benzodiazepin-6-one, the preparation of which is given in Example I. The oral $LD_{50}$ for this compound is about 800 mg./kg.

What is claimed is:
1. A compound having the formula:

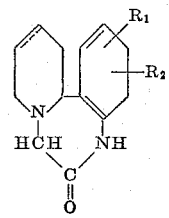

wherein the dotted line indicates that the linkage between the 10 and the 11 positions is selected from the group consisting of a single bond and a double bond; $R_1$ is selected from the group consisting of hydrogen, chlorine, bromine, and trifluoromethyl; and $R_2$ is selected from the group consisting of hydrogen and chlorine.

2. 5,7,8,9,10,11,12,12a-octahydro-6H-pyrido(1,2-d)(1,4)benzodiazepin-6-one.

3. 5,7,8,9,12,12a-hexahydro-6H-pyrido-(1,2-d)(1,4)benzodiazepin-6-one.

References Cited by the Examiner

Adkins: Reactions of Hydrogen (Wisconsin, 1937), pages 56–67 and 137–138.

Gaylord: Reduction with Complex Metal Hydrides (New York, 1956), pages 100–102, 789–793, 824 and 966–968.

Klingsberg: Pyridine and Derivatives, Part Two (New York, 1961), page 46.

NICHOLAS S. RIZZO, *Primary Examiner*.

UNITED STATES PATENT OFFICE
CERTIFICATE OF CORRECTION

Patent No. 3,185,680                          May 25, 1965

Peter Hsing-Lien Wei

It is hereby certified that error appears in the above numbered patent requiring correction and that the said Letters Patent should read as corrected below.

Column 4, lines 3 to 12, the formula should appear as shown below instead of as in the patent:

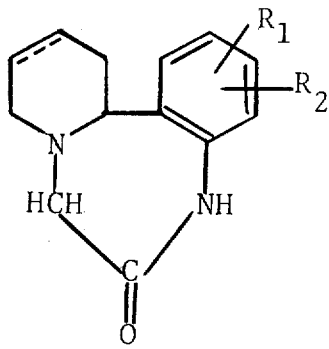

Signed and sealed this 10th day of May 1966.

(SEAL)
Attest:

ERNEST W. SWIDER                         EDWARD J. BRENNER
Attesting Officer                       Commissioner of Patents